Feb. 15, 1938.   J. A. McDANIEL   2,108,264
GEAR SHIFTING MECHANISM
Filed Aug. 9, 1933   3 Sheets-Sheet 1
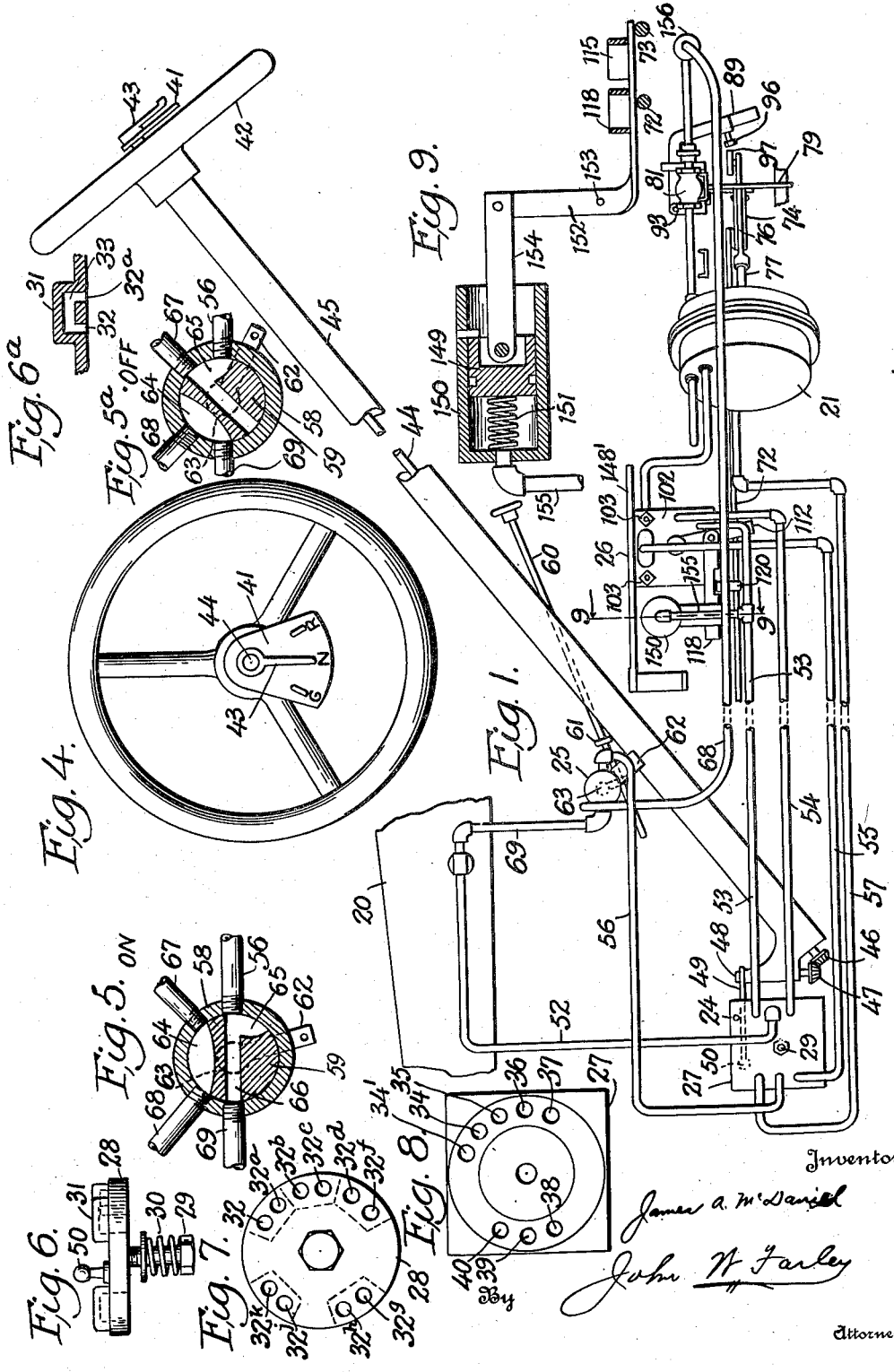
Inventor
James A. McDaniel
John W. Farley
By
Attorney

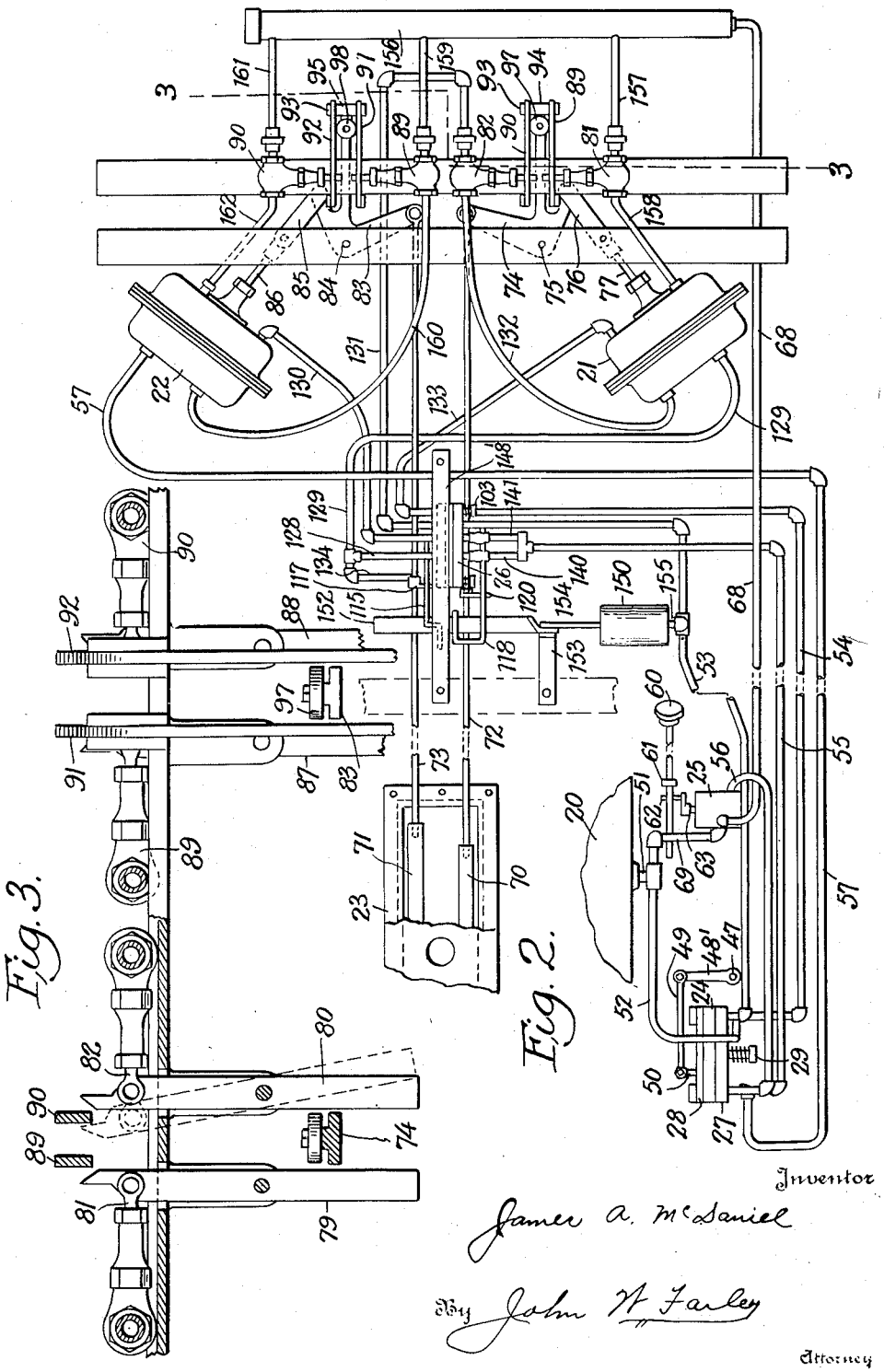

Feb. 15, 1938.  J. A. McDANIEL  2,108,264
GEAR SHIFTING MECHANISM
Filed Aug. 9, 1933  3 Sheets—Sheet 3
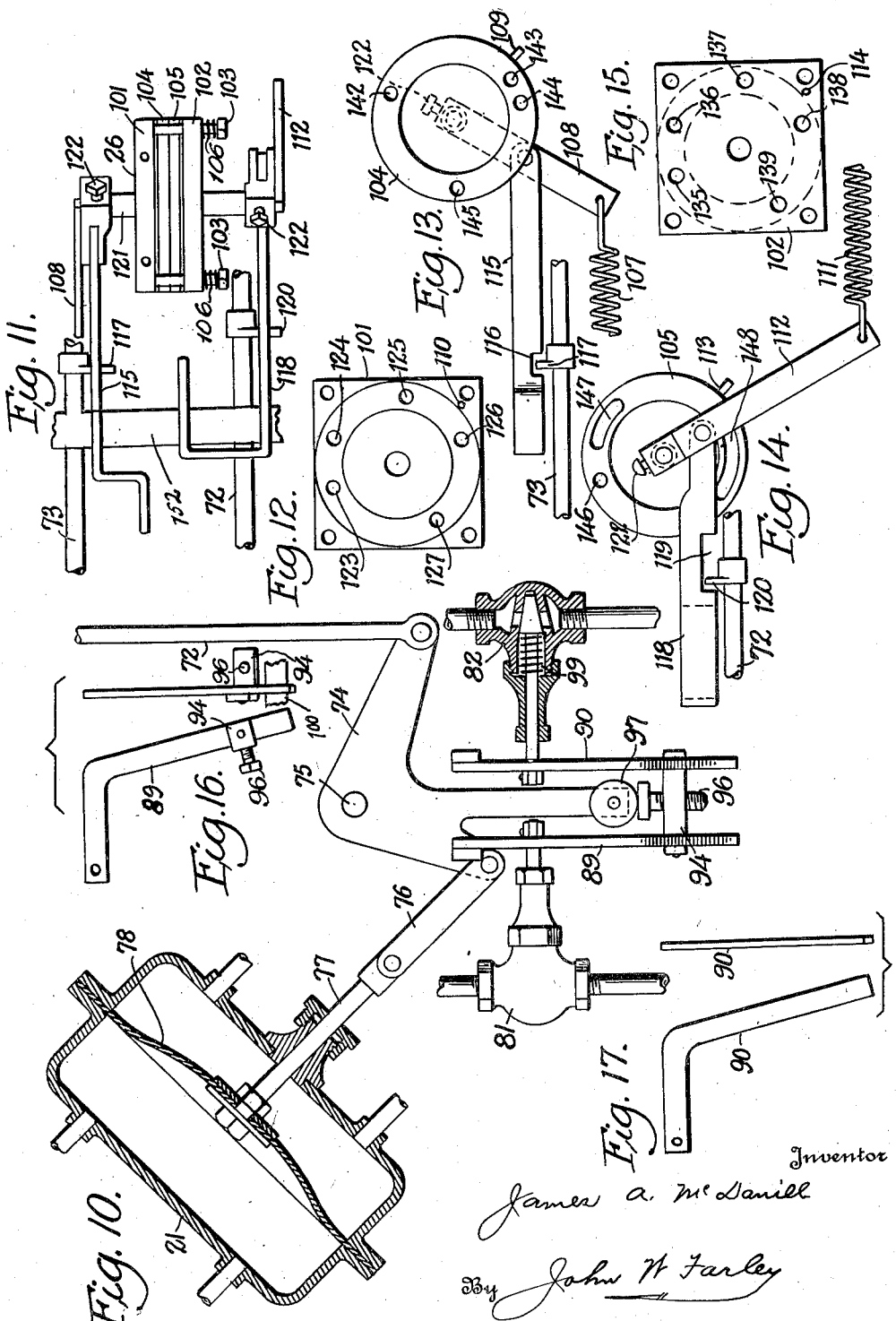
Inventor
James A. McDaniel
By John W Farley
Attorney Patented Feb. 15, 1938

2,108,264

UNITED STATES PATENT OFFICE 2,108,264

GEAR SHIFTING MECHANISM

James A. McDaniel, Memphis, Tenn.

Application August 9, 1933, Serial No. 684,449

16 Claims. (Cl. 74—472)

My invention relates to gear shifting mechanism and it is an object of the same to provide for simple and effective means to effect such shifting, as for example in motor vehicles, wherein the gear shift lever may be dispensed with or may be carried in some out of the way place for use in case of emergency.

It is an object of the invention to provide means of this character which shall be easily applied to cars of standard make without interfering with the operation of the motor or the car and without requiring any change of design. It can easily be attached to a motor vehicle by a person of ordinary skill, since all that is necessary is to drill a hole in the intake manifold with proper care and in the right place and to attach additional operating rods to the sliding rods now in use in the transmission, and also to attach such brackets and fixtures as are necessary for holding the parts in place. It can be used on any motor vehicle having the so-called "standard" transmission. If the operator does not wish to use the device he can simply return the shifting lever to usual position and utilize it without respect to the device of my invention; in other words, it is a purely optional device and is similar in this respect to the free wheeling attachments now in common use.

Referring to the drawings, which are made a part of this application and in which similar reference characters indicate similar parts:

Fig. 1 is a side elevation of a preferred form of my invention,

Fig. 2, a plan thereof,

Fig. 3, a section on line 3—3 of Fig. 2,

Fig. 4, a plan of the steering wheel of a motor vehicle, showing parts of my invention, Figs. 5 and 5a sections of an accelerator valve forming part of my invention and showing two different positions thereof, Figs. 6, 6a, 7 and 8 details of the driver's control valve under the hood, Fig. 9, a longitudinal section of a piston and its casing, taken on line 9—9 of Fig. 1, Fig. 10, a horizontal section of a piston forming part of the gear-shifting devices, coacting parts being shown in plan, Fig. 11, a detail of parts in Fig. 2, but on an enlarged scale, Figs. 12 to 15, details of the gear selector valve, here shown as under the rear seat, and Figs. 16 and 17, details of locking members.

In the drawings, reference character 20 indicates the intake manifold of a motor vehicle, which manifold is connected to pistons in casings 21, 22 for actuating them so as to shift the gears, e. g., of a standard gear transmission with standard shifting means such as shown at 23.

A driver's control valve 24 is arranged to be set by the driver to predetermine the direction and character of shifting, an accelerator valve 25 determines when the shifting operation shall take place, and a gear selector valve 26 locks the gears in shifted position. While the device is described as vacuum-operated, as a matter of convenience, it is of course mainly operated by the normal atmospheric pressure acting on the side of the piston opposite to that from which air is exhausted to the intake manifold.

The driver's control valve

The driver's control valve (see Figs. 1, 2, 6, 6a, 7, and 8) comprises a fixed plate 27, and a plate 28 pivotally supported on plate 27 by a screw 29 held down by a spring 30. The movable member of the valve has five caps 31 underneath which are ports 32, 32a, 32b, 32c, 32d, 32f, 32g, 32h, 32j, 32k arranged in pairs, the ports of each pair being connected by passages 33 (Fig. 6a). By rotating plate 28 different pairs of the ports 34—40 in plate 27 may be connected for predetermining the action of the gear-shifting mechanism. For setting the plate 28 in desired position I have provided means comprising a quadrant 41 on the usual steering wheel 42, this quadrant being marked N for neutral, G for gear-shift for forward speeds and R for reverse. An indicating finger 43 coacting with said quadrant is fixed to a rod 44 extending down through the steering column 45 and is provided at its lower end with a pinion 46 meshing with a pinion 47 on an upright shaft 48 having an arm 48' (Fig. 2) connected by a link 49 to a stud 50 on plate 28 by means of a ball and socket joint.

The manifold is connected by pipes 51, 52, to the port 35 on the fixed plate 27. Port 34 leads to a pipe 53, whose functions are hereinafter described. Port 35 leads to the intake manifold by way of pipe 52. Port 36 leads to pipe 54 which is connected to the gear selector valve. Port 37 is an air intake opening used in connection with the operation of shifting to third gear. Port 38 leads to pipe 55 which controls the selector valve for shifting to first and second gear. Port 39 is connected to pipe 56 which is the main vacuum line from the foot-operated accelerator valve hereinafter described. Port 40 leads to pipe 57 which controls the reverse movement.

The accelerator valve

The foot-operated accelerator valve is shown in Figs. 1, 2, 5 and 5a and comprises a casing 58 in which a plug 59 is oscillated in one direction by the usual foot accelerator 60 which is provided for this purpose with a fixed collar 61 that strikes against an arm 62 on a stud-shaft 63 extending axially from the plug 59. The plug may be returned from "On position" of Fig. 5 to "Off position" of Fig. 5a, by a spring (not shown).

The plug has peripheral recesses 64 and 65 and a transverse passage 66 and the casing has four ports of which that at 67 is merely an air intake opening, whereby also the vacuum may be broken at suitable times in the piston casings 21 and 22 as hereinafter set forth. The next port, reading clockwise in Figs. 5 and 5a, is connected to a pipe 56 leading to the driver's control valve at port 39 on plate 27. The next port is connected to the main vacuum line at the intake manifold by a pipe 69. The last port is connected to pipe 68 which is the return line for controlling the means for putting gears out of mesh. It will be seen that in the "On" position of Fig. 5 the return line 68 is open to air through port 67 and recess 64 while the main vacuum line is connected to the driver's control valve through passage 66, whereas in the "Off" position of Fig. 5a the main vacuum line is connected to the return line through recess 64 and the driver's control valve is open to air at port 39 by way of recess 65.

The gear shifting devices

The immediate means for shifting the gears comprises two slidable rods 70, 71 which may be of standard character and which can be moved by the usual shift lever, but said lever may be taken out and laid away under a seat or otherwise disposed of so as to be available for use in case of failure of the automatic device, just as a starting crank is carried in most automobiles for use in emergency. The ordinary shift lever may also be left in place if desired but it is a feature of advantage in my invention that the shift lever can be removed and put out of the way so as to leave the space at the front of the car free except for the emergency brake lever.

To the rods 70, 71 I connect the respective rods 72 and 73. Rod 72 (Figs. 1, 2 and 10) is attached at its rear end to a three-armed lever 74 pivoted at 75 and having one of its arms connected to a link 76 attached to the stem 77 of the flexible piston 78 in casing 21. The third arm of the lever swings between a pair of depending levers 79 and 80 connected adjacent their upper ends respectively to stems of gate valves 81 and 82 such as shown in Fig. 10.

The rod 73 in like manner is connected to a three-armed lever 83 pivoted at 84 and connected by a link 85 to the stem 86 of a flexible piston in casing 22. The third arm of the lever 83 is located between two levers 87 and 88 for operating gate valves 89 and 90.

At their upper ends the levers 79, 80, 87 and 88 are reduced in width at one side and beveled at the other and locking means is provided for each lever, whereby each one may be held in place for holding its valve open, after having been moved from the neutral position to an active position such as illustrated in dotted lines in Fig. 3. For this purpose I provide angular locking members 89, 90, 91 and 92 (Figs. 1, 16, and 17) pivoted as at 93. The members of each pair are operatively connected by a cross piece 94, 95 on one member of a pair as shown in Figs. 2 and 10, and each cross piece carries an adjustable screw 96. Each lever 74, 83 has on its third arm a roller 97, 98 which strikes the head of the adjacent screw in moving from an active position back to neutral position and so releases the lock of an open valve to permit it to be closed by a spring, as at 99 (Fig. 10). The cross piece is attached only to one locking member of a pair so as to permit the locking members to move independently to locking position, since only one valve need be locked open at any one time.

Lateral movement of the locking members under the partially lateral thrust of the rollers 97, 98 is prevented by guides 100 suitably secured to a fixed part of the motor vehicle or other machine or mechanism with which my invention is used.

The gear selector valve and associated parts

The gear selector valve 26 comprises parts shown in detail in Figs. 11 to 14, including fixed plates 101, 102, held together by screws 103 at their four corners and pressed resiliently against interposed circular plate valve members or disks 104, 105 by springs 106 encircling said screws 103. The plate 104 is moved clockwise by a spring 107 connected to an arm 108 on the plate, the spring being anchored at its other end to any convenient part and its movement is limited by a pin 109 striking a stop 110 on fixed plate 101. Plate 105 is moved counterclockwise by a spring 111 connected to an arm 112 fixed to said plate and anchored to a fixed part of the machine at its other end and its movement is limited by a pin 113 striking a stop 114 on fixed plate 102.

The arm 108 is adapted to be connected to rod 73 by a bent link 115 pivotally secured to arm 108 and having at 116 a notch adapted to engage a lug 117 on said rod. In like manner, bent arm 112 is adapted to be connected to rod 72 by means of link 118 having a notch at 119 adapted to engage a lug 120 on said rod. The arms 108 and 112 are fixed adjustably to a shaft 121 by set-screws 122.

Plate 101 is provided with ports 123 to 127, the port 123 opening into pipe 128 teed into pipe 129 leading to the left side chamber of piston casing 21. Port 124 opens into pipe 130 leading to the right side of piston casing 22. Port 126 opens into pipe 131 leading to gate valve 82, connected by pipe 132 to the left side of casing 21. Port 125 opens into pipe 133 passing directly to the right side chamber of casing 21. Port 127 opens into pipe 134 which connects with pipe 129.

At the other side of the valve, plate 102 has ports 135—139. Two branches 140 and 141 of pipe 55 lead respectively to ports 135 and 136. Pipe 54 leads into port 137, pipe 53 to port 138, and port 139 is an air intake port.

The disk 104 (Fig. 13) has ports 142—145 and the disk 105 (Fig. 14) has ports 146—148, ports 147 and 148 being arcuate slots. The ports in the disks register with adjacent ports at both side of each disk according to the position of rotary adjustment of the disks. A bracket 148' supports the gear selector valve mechanism.

A device for controlling the interengagement of links 115 and 118 with the rods 72 and 73 is shown in detail in Fig. 9 (see also Figs. 1 and 2). This device comprises a piston 149 in a casing 150. A spring 151 forces the piston toward the right in said figure and so tends to hold in lowered position a bent lever 152 pivoted at 153 and connected to the piston by a link 154. The bent lever at its free end extends under links 115 and 118 but above rods 72 and 73. A branch 155 of pipe 53 leads into the left end of casing 150.

Other features

The reversing means includes the pipe 57 which leads from the driver's control valve 24 to the left side of piston casing 22. The return line 68 extends from the accelerator valve to an air supply line 156 at the rear of the mechanism and line 156 is connected (1) to the right or rear chamber of piston casing 21 by pipes 157 and 158 between which gate valve 81 is interposed (2) to the front chamber of piston casing 22 by pipes 159 and 160 between which gate valve 89 is interposed and (3) to the rear chamber of casing 22 by pipes 161 and 162 between which gate valve 90 is interposed.

Operation

In the drawings the parts are shown in neutral position. If now it is desired to shift to first or low speed the indicator 41 on the quadrant is moved to the position marked "G". Through the train of connections shown in Fig. 1 the disk 28 is now moved to a position wherein the ports register as follows:

32a with 34
32b with 35
32c with 36
32d with 37
32g with 38
32h with 39
32j with 40, the remaining ports being blind, i. e. being closed by the solid portion of the stationary plate.

At this time the disks of the gear selector valve are so located that port 147 is aligned with ports 136, 142 and 124 to provide a passage through this valve which passage connects pipe 130 and branch 141 of pipe 55.

There is no operation of the mechanism until the driver steps on the accelerator, thereby moving the accelerator valve to operating position. As the operation of this device assimilates itself closely to the ordinary method of shifting gears it will be understood that the clutch has been thrown out manually before touching the accelerator, as usual unless free wheeling is being used. When the accelerator valve has been moved to the "On" position of Fig. 5 the connections from the intake manifold will act to exhaust the air from the rear chamber of piston casing 22 through the T coupling 51, pipe 69, passage 66 (Fig. 5) pipe 56, ports 39, 32h, 32g and 38 of the driver's control valve to pipe 55, then to branch 141, through ports 136, 147, 142, 124 to pipe 130 and so to the right hand chamber or rear side of piston casing 22. Due to the exhaustion of air from this side of the casing the flexible piston will be moved in the direction indicated in Fig. 10, the other side of the casing being under normal atmospheric pressure of approximately 15 pounds per square inch. As the piston moves in the direction indicated, it moves the three armed lever 83 clockwise about its pivot 84 and this lever opens the gate valve 89 by striking against depending lever 87, thus admitting air from the air supply line 156 to the left hand side of the piston casing through pipes 159 and 160 to maintain the pressure at that side of the piston. Concurrently with such operation the arm of the lever which is connected to rod 73 moves this rod and rod 71 to the left to shift the gears toward first forward position or low speed position. At this time also the locking member 91 is cammed up by the bevel at the upper end of lever 87 and falls behind it so as to lock the lever in a position analogous to the dotted line position of lever 80, illustrated in Fig. 3, locking the gate valve 89 open.

As the operating rods 73 and 71 are moved forward the lug 117 comes into position under the slot 116 in link 115 and the link falls so as to connect the rod 73 operatively to link 115. The parts are now in position for shifting to second speed if desired or the indicator 43 on the quadrant can merely be moved to position "N" if the operator does not desire to go to a higher speed.

When the parts are in neutral position the ports of the driver's control valve register as follows:

32b with 34
32c with 35
32d with 36
32f with 37
32h with 38
32j with 40, while the remaining ports are blind.

The low pressure at the right in casing 22 is now relieved by air entering port 67 of the accelerator valve and passing via recess 65 to pipe 56, then to ports 39, through a passage 33 to port 40 and through port 32f to pipe 57 and so to the casing.

To shift into second gear from first or low gear, it is only necessary for the driver to throw out the clutch again and step on the accelerator and he need not go into neutral. The link 115 being now hooked to rod 73, the gear selector valve disk 104 will be moved about its pivot during the return movement of rod 73 to shift the gears out of first position. For this purpose the driver throws out the clutch and takes his foot off the accelerator. The accelerator valve goes to "Off" position (Fig. 5a) connecting air supply pipe 156 to the intake manifold through pipe 68, chamber 64 and pipe 69 so as to withdraw air from supply pipe 156 and permit the piston in casing 22 to return quickly to normal position. As the piston moves back to the middle position, the rod 73 is moved to the right and the roller 98 on lever 83 unlocks the lever 91, permitting the gate valve 89 to close.

Movement of rod 73 to the right in Fig. 2 brings disk 104 into a position where port 142 registers with ports 135, 146 and 123 and upon again pushing down the accelerator rod the suction of the intake manifold will act through coupling 51, pipe 69, passage 66 (Fig. 5) pipe 56, ports 39, 32h, 32g and 38 of the driver's control valve, pipe 55, branch 140, ports 142, 135, 146 and 123 and pipe 129 to exhaust the air in the left-hand chamber of piston casing 21, whereby the flexible piston will act through three-armed lever 74 to move rods 72 and 70 to the right to shift to second, such operation also opening gate valve 81 and locking it, all in like manner as above described for low gear. This movement of rod 72 places it in a position where its lug 120 can engage notch 119 in link 118, preliminary to shifting to third gear, and the link 118 being free to move downward such engagement now takes place. At this time both links 115 and 118 are clutched to the respective rods 73 and 72.

To go into third gear the driver first throws out the clutch and releases the accelerator, upon which the piston 78 (Fig. 10) is returned to its normal position as above described in connection with shifting to second gear, so that the shift rods 72 and 70 are operated to take the gears out of second speed position. Such movement brings the disk 105 into a position where the ports 137, 147, 143 and 125 are aligned. The suction of the intake manifold now acts through coupling 51, pipe 52, ports 35, 32b, a cap 31, ports 32c and 36, pipe 54, the aligned ports of the gear selector valve, and pipe 133 to reduce the pressure in the right chamber of casing 21 so that the flexible piston moves to the right and swings lever 74 counterclockwise, thereby drawing rods 72 and 70 to the left to shift to third gear, such movement also opening gate valve 82 and locking it open by means of locking element 90 to connect the left hand chamber of casing 21 to the pipe 131 through pipe 132. The air chamber just referred to is not connected to the air supply pipe 156 but the return movement of rod 72 and link 118 has brought into alignment ports 139, 148, 145 and 127 of the respective members 137, 105 and 101 of the gear selector valve. The port 139 is open to atmosphere and it furnishes additional air when the gears are coming out of second and going into high, which air passes through the aligned ports and through pipes 134 and 129 to the left hand chamber of the casing 21 to force the piston over as the air is exhausted from the other side. Air is furnished by the other lines to bring the gears out of second and this line furnishes additional air for moving into third speed in a continuous operation. The port 148 is formed as a slot so as not to interrupt the continuity of its registry with port 145 in the continuous operation of shifting out of second and into third or high gear. The accelerator is not operated at this time as the car is driven normally in high gear and a continuous vacuum is desired. To maintain this continuous vacuum pipe 54 is connected as above stated.

To shift out of high gear the clutch is thrown out and the indicator or the quadrant is set at neutral "N". The suction now acts through pipes 53 and 155 on piston 149, tilting lever 152 and raising links 115 and 118 out of engagement with rods 72 and 73. The springs 107 and 111 swing the disks 104 and 105 back until stopped by engagement of pin 109 with stop 110 and pin 113 with stop 114 respectively. Such movement places ports 138, 148, 144 and 126 of the gear selector valve in alignment and, as port 126 leads to a pipe 131, the suction from the manifold can now be exerted through pipes 53, 131 and 132 to the left chamber of casing 21 to reverse the movement of lever 74 and connected parts.

For reverse gear the indicator 41 is moved to "R" and this causes the parts in the driver's control valve to register as follows:

32c with 34
32d with 35
32f with 36
32j with 39
32k with 40

The other ports are blind. The driver now throws out the clutch and depresses the accelerator rod to move the accelerator valve to "On" position, whereupon the suction from the manifold acts through coupling 51, pipes 69, and 56, ports 39, 32j, a passage 33, ports 32k and 40 and pipe 57 to reduce the pressure at the left of casing 22, whereupon the piston moves the lever 84 counter-clockwise and draws the rods 73 and 71 rearward, also opening valve 90 and locking it open by element 92. To go out of reverse the indicator 43 is moved to neutral, as explained above. It may be noted that pipe 55 acts as a vacuum line in both first and second gear operations when the foot accelerator is down, but as an air intake line in both operations when the accelerator rod is released. There are four air intakes respectively at 37, in connection with high gear; at 139, which operates only in connection with high gear; at 34' that operates only in connection with piston 149, and at 67 in the foot selector valve that operates in shifting to first, second and reverse and also in passing out of first, second and reverse to neutral. Air intakes 81 and 139 supply the air used in passing from second to third; intake 81 serves in going from second to neutral and intake 139 in carrying on from this point in neutral to high.

It will be obvious to those skilled in the art that various modifications may be made in my device without departing from the spirit of the invention, therefore I do not limit myself to what is shown in the drawings or described in the specification but only as indicated in the appended claims.

Having thus fully described my said invention, what I claim as new and desire to secure by Letters Patent, is:

1. In a mechanism having an internal combustion engine, an intake manifold therefor and change-speed gearing, the combination of gear-shifting devices, means whereby the character of the gear change may be predetermined, means operated by the suction of the intake manifold for actuating the gear-shifting devices, said means including sliding transmission rods, pistons connected to said rods for moving them in opposite senses to produce different speeds, casings for said pistons, connections from said manifold to said casings for causing suction effects at opposite sides of the pistons, pipes for admitting air to that side of the piston where suction is not being exerted, valves in said pipes, and means for normally locking a valve positively in open position during the operation of a corresponding piston.

2. A device as in claim 1, including means operated automatically during return movement of such a piston for unlocking said locking means.

3. In a device of the character described, a driver's control valve, a gear selector valve, gear shifting rods, pneumatic means for actuating said gear shifting rods, pipes connecting the above-named devices to each other and to the intake manifold of an internal combustion engine, means for setting the driver's control valve to predetermine the rod to be shifted and the direction of its movement, manual means controlling the connection between the intake manifold and the remaining parts of the combination, links adapted to be connected to the respective shifting rods, connections from said links to the gear selector valve for altering the relation of the parts therein with reference to the pipes connected thereto, and means operated through the driver's control valve for controlling the relation of said links to said shifting rods.

4. In a pneumatic gear shift, a pair of shifter rods, flexible pistons operatively connected to the respective rods, casings for said pistons providing air chambers at opposite sides of each piston, each piston having its peripheral edge secured to its casing to seal said air chambers, manually controlled means for connecting said chambers selectively to an intake manifold for creating a vacuum therein, and automatic means for admitting air to the opposed chamber when a vacuum is created in any chamber.

5. A device as in claim 4, including manually operable setting means for predetermining the gear-shifting operation, and connections to a foot-operated accelerator rod for controlling the connection to the intake manifold.

6. A device as in claim 4, including air passages leading to said chambers, valves in said passages, and automatic means for positively locking open the passages so admitting air to said chambers.

7. In a pnuematic gear shift, a pair of gear shifting rods, a piston for each rod, a casing for each piston providing an air chamber at each side of its piston, means for connecting a chamber to a source of suction including a gear selector valve, a link adapted to be automatically connected to a shifting rod at one end of its movement but normally disconnected therefrom, and means operated by said rod through said link for altering the relation of ports and passages in said gear selector valve upon return movement of said rod.

8. In a pneumatic gear shift, a shifting rod, a piston connected thereto, a casing providing a chamber at each side of the piston, means for exerting suction at one side of the piston, means operated by said piston for admitting air to the other side, and means for locking open the air passage to said side when the shifting operation is completed.

9. A device as in claim 8, including means operated by the piston for unlocking said locking means upon a reverse operation of the piston.

10. In a pneumatic gear shift, a shifting rod, a piston connected thereto, a casing providing a chamber at each side of the piston, means for exerting suction at either side of the piston selectively for shifting said rod in either direction, means for admitting air to the other side of the piston, means for locking open the passage that admits air, and common means operated by the piston for unlocking the locks for both the air passages leading to opposite sides of the piston.

11. In a change speed gearing, a set of gears, pneumatic gear shifting means including pistons connected to the gears of said set, cylinders for said pistons, a source of suction, pipes connecting said source of suction to opposite ends of said cylinders, means for admitting air to said cylinders, a steering post, a driver's control valve comprising oscillatory plates in face contact with each other, means for adjusting said plates to predetermine the operation of the gear shifting means, and manual means for controlling the connection between said pistons and the source of suction independently of said driver's control valve.

12. In a pneumatic gear shift, a pair of shifter rods, pistons connected to the respective rods, casings for said pistons providing chambers at opposite sides of each piston, manually controlled means for connecting said chambers selectively to a source of suction, automatic means for admitting air to the opposite chamber when a vacuum is created in any chamber said means including passages leading to such chambers, valves in said passages, means operated by the initial movement of a piston for opening the valve in a passage leading to the related chamber, and means for locking said valve in open position.

13. A device as in claim 12, said valve opening means including a lever connected to the piston and to the corresponding gear shift rod.

14. A device as in claim 12, said valve opening means including a lever connected to the piston and to the corresponding gear shift rod, and a lever connected at one end to said valve in position to be actuated by said first-named lever.

15. A device as in claim 12, said valve opening means including a lever connected to the piston and to the corresponding gear shift rod, a lever connected at one end to said valve in position to be actuated by said first-named lever, said second-named lever standing in a vertical position and having a cam edge at its upper end, and a pivoted detent positioned to be raised by said cam edge and then to fall behind said lever to lock its valve open.

16. A device as in claim 12, said valve opening means including a lever connected to the piston and to the corresponding gear shift rod, a lever connected at one end to said valve in position to be actuated by said first-named lever, said second-named lever standing in a vertical position and having a cam edge at its upper end, a pivoted detent positioned to be raised by said cam edge and then to fall behind said lever to lock its valve open, said first-named lever embodying means for subsequently releasing said detent.

JAMES A. McDANIEL.